United States Patent Office 2,813,040
Patented Nov. 12, 1957

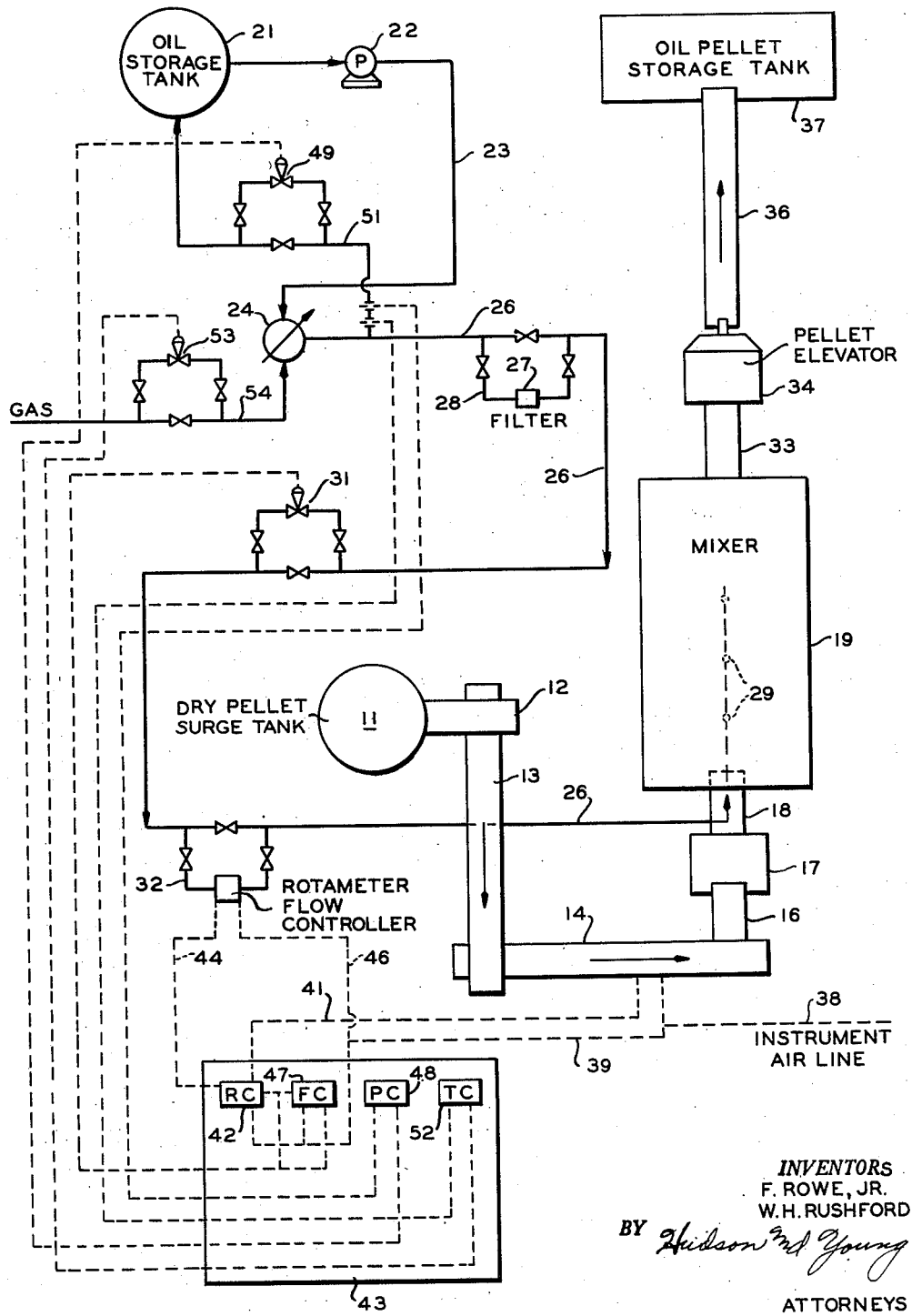

2,813,040

INCORPORATION OF EXTENDER OIL IN CARBON BLACK

Fred Rowe, Jr., and Wilson H. Rushford, Borger, Tex., assignors to Phillips Petroleum Company, a corporation of Delaware Application August 28, 1953, Serial No. 377,220

7 Claims. (Cl. 106—307)

This invention relates to a process and apparatus for impregnating dry pellets of carbon black with a controlled proportion of oil.

Carbon black for various uses in industry, such as incorporating in rubber in the tire industry, is formed into small, dry pellets of the black for convenience in handling. It has been found that carbon black pellets in dry form are difficult to unload from hopper cars in which the pelleted black is transported, probably because of the dusting of the pellets and the loose dust which is present with the pellets. It has also been found that the incoration of oil into dry carbon black pellets greatly improves their flow characteristics and eliminates dusting of the pellets to a large extent, with reduction in loss, and makes them cleaner to handle and less obnoxious from this point of view.

In the production of rubber for automobile tires and other uses, it is conventional to incorporate in the mix from which the rubber is compounded a certain amount of extender oil along with the carbon black. The incorporation of the extender oil in controlled proportions to carbon black pellets provides the user with a specific proportion of extender oil and also facilitates the handling of the carbon black by decreasing dusting and increasing the flowability of the carbon black pellets. The incorporation of a specific uniform amount of oil in the pellets is desirable in order to permit the manufacturer to control the amount of oil added to the rubber mix.

An attempt was made to pellet loose carbon black and simultaneously add oil thereto, but this procedure was unsuccessful, largely because of the impossibility of controlling the rate of flow of the loose black. Loose black has such poor flow characteristics and varies in density often times as much as 50 to 100% that it is impossible to maintain its flow rate in weight per unit of time even reasonably close to a constant.

Another attempt was made to incorporate a controlled proportion of extender oil in dry carbon black pellets by continuously weighing the pellets as they emerged from the spraying operation and regulating the flow of oil in proportion to the weight of the pellets being introduced to the spraying operation. This method produced so much off-specification product because of the impossibility of maintaining an absolutely constant flow of pellets and the weighing of the oil pellets after they came from the spraying operation thereby correcting the proper flow of oil after the off-specification pellets were made, that the process was not commercially successful.

One of the objects of the invention is to provide a process for impregnating dry carbon black pellets with a controlled uniform proportion of oil. Another object of the invention is to provide a process for the automatic control of the impregnation of dry carbon black pellets with a specific uniform proportion of oil. An additional object is to provide apparatus for automatically regulating the ratio of oil to dry carbon black pellets being fed to a pellet tumbling device. A further object is to improve the flow characteristics of carbon black pellets. It is also an object of the invention to reduce dusting of carbon black pellets and resulting loss of black. Other objects of the invention will become apparent from consideration of the accompanying disclosure.

In accordance with the invention, dry carbon black pellets are fed as uniformly as possible to a weighing conveyor which transfers the dry pellets to a pellet tumbler, or mixer, in the form of a horizontally elongated cylinder, or drum, in which a controlled amount of oil is sprayed onto the bed of pellets maintained therein as they flow from the inlet end to the exit end of the mill in a relatively deep bed. The flow rate of oil is automatically controlled in response to variations in the weight of pellets passing over the weigh conveyor so that the product pellets contain a definite predetermined proportion of oil. In effecting automatic regulation of oil flow, the weigh conveyor translates weight values into a force of varying intensity proportional to the weight values. The flow of oil to the pellet mill is set in accordance with the weight of the pellets being passed to the pellet mill and is varied as the weight of the pellets varies by means of a rotameter-flow-controller in the oil line which measures the rate of flow of the oil and translates the same into a force of varying intensity proportional to the flow rate. These proportional forces of varying intensity set up by the weigh conveyor and the rotameter-flow-controller are applied to a ratio-controller-recorder which measures the ratio of the two forces and maintains a constant ratio therebetween by means of a motor valve in the oil line by varying the flow rate through the line so as to maintain the ratio of oil to pellets constant in terms of weight.

One arrangement of apparatus utilizes pneumatic devices which effect the desired regulation. The weigh conveyor includes a weight-indicating transmitter which translates weight values into air flow rates or air pressure in a line which is connected to a pneumatic flow-transmitter. The rotameter-flow-controller in the oil line is also connected, by means of air lines, to the ratio-controller-recorder. The rotameter-flow-controller transmits a pneumatic force or signal which is directly proportional to the rate of flow through the oil line. A ratio-controller-recorder (instrument 42 in the drawing) compares the forces or signals received from the weigh belt transmitter and the rotameter transmitter to obtain a ratio between these forces. The resulting ratio is translated to a pneumatic force or signal which is transmitted to a flow controller which monitors the oil rate to the pellet mill by varying the signal or pneumatic pressure to a motor valve in the oil line, thereby maintaining a constant ratio of weight of oil to weight of pellets flowing into the mill for which the ratio-controller (instrument 42) is set.

In another embodiment of the invention, instrument 42 is a ratio-flow-controller which also includes instrumentation for controlling flow of oil so as to maintain a substantially constant ratio of oil to the mixer thru control of motor valve 31. When such an instrument is used, it is connected on the control side directly with motor valve 31 instead of with instrument 47. The weigh conveyor, ratio-flow-controller, other instruments, and apparatus, illustrated diagrammatically in the drawing, are available commercially and are not shown in detail.

In order to facilitate the proportioning of oil to pellets, it is desirable and expedient to maintain the oil at a substantially constant elevated temperature. This is conveniently done by passing the oil through a gas-type heater to which the flow of heating gas is controlled in response to the temperature of the effluent oil. It is preferred to maintain the oil at a temperature in the range of 250–400° F., but this is not essential to the invention as oil can be successfully sprayed into the pellets at higher or lower temperatures than this range.

For a more complete understanding of the invention, references may be had to the drawing which is a diagrammatic showing of one arrangement of apparatus in accordance with the invention. Dry pellets are passed from surge tank or storage 11 by means of a chute 12 onto a conveyor belt 13 which transports the pellets in a relatively uniform stream to a weigh conveyor belt 14. Weigh conveyor belt 14 weighs the pellets passing thereover and delivers them to a chute 16 leading into hopper 17 from which the pellets gravitate, by means of chute 18, into the end of cylindrical tumbling drum, or mixer, 19.

Oil for the process, stored in tank 21, is forced by pump 22 in line 23 through heater 24 where it is heated to the desired temperature, as hereinafter described. The hot oil then passes through line 26, including filter 27 in line 28, and the filtered oil continues in line 26 to mixer 19 into which it passes by means of spray nozzles 29.

Motor control valve 31 in line 26 regulates the flow of oil through this line in the manner hereinafter described. Instrument 32 in line 26 continuously measures the flow rate of oil in the line and functions with the control system as hereinafter described.

Oiled pellets containing a predetermined proportion of oil egress from pellet mill 19 by means of chute 33 into elevator 34 which elevates the pellets to conveyor belt 36 for passage to oil pellet storage tank 37.

Weigh conveyor 14 includes a weight-indicating transmitter, which is actuated by compressed air from instrument air line 38, which connects with air distributing line 39. The weight-indicating transmitter connects by air line 41 with a ratio-controller 42 on instrument panel 43. Ratio-controller 42 is connected by means of air line 44 to rotameter-flow-controller 32. Instrument 42 is actuated by pneumatic pressure transmitted by instrument 32 in the flow of air in line 41 from the weight indicating transmitter of the weigh conveyor and translates the pneumatic forces received into a pneumatic force which represents the ratio of flow rate of oil in line 26 to the weight of the pellets passing over weigh conveyor 14. The pneumatic force transmitted by instrument 42 actuates flow-controller 47 so as to maintain a constant ratio between the flow rate of oil and the weight of pellets passing to the pellet mixer in accordance with the setting of instrument 42. Instrument 47 varies the flow of oil in line 26 by regulating motor valve 31 so as to vary the flow rate as the weight of pellets passing over the weigh conveyor varies.

It is also feasible to utilize electrical instrumentation which utilizes weight values recorded by the weigh conveyor and flow rate values from the rotameter to maintain a constant ratio of oil to pellets by control of motor valve 31.

In the system shown in the drawing, a pressure controller instrument 48, connected with oil return line 51, actuates motor valve 49 in line 51 so as to maintain a constant pressure in line 26 upstream of the oil control valve 31. In a similar manner, temperature controller 52 connects with oil return line 51 and with motor valve 53 in gas line 54, which supplies fuel gas to heater 24. In this manner, flow of fuel gas is regulated so as to maintain a constant, predetermined oil temperature.

EXAMPLE

Apparatus was arranged substantially as shown in the drawing, utilizing a ratio-flow-controller connected directly with the motor valve in the oil line. Approximately 6000 pounds per hour of dry pellets of 22 to 24 lb./ft.³ were delivered to the weigh conveyor (Conveyo-Flo) which fed them to a Huber mill or mixer 10 ft. in diameter by 12 ft. long. The ratio-flow-controller was set to deliver 8 pounds of Circosol 2XH extender oil per 100 pounds of dry pellets. The Huber mill contained 8 baffles of 4" by 4" angle iron 10 ft. long welded to the inside wall 45° apart, which aided in mixing the oil with the pellets. The mill was rotated at a speed of about 7 R. P. M. and the pellet bed depth was maintained at about 39 inches. Oil was maintained at a temperature of 350° to 400° F. and was sprayed onto the pellets by 10 to 15 Monarch F-80 jet sprays, the number depending upon the rate of production.

Samples of effluent pallets were taken at regular intervals and were subjected to the Goodyear 20-minute destruction test in which 25 gram samples are shaken in a Roto Tap shaker for 20 minutes and the material passing the screen is weighed and corrected to percent —100-mesh. The data obtained from samples taken on four successive days are presented in the table.

Table

| Sample No. | (Parts Circosol 2XH/) (100 Parts PB "A") | —100-Mesh, percent | |
|---|---|---|---|
| | | Dry Feed | Oil-Treated |
| 1 | 7.7 | 5.8 | 0.00 |
| 2 | 8.3 | 4.9 | 0.10 |
| 3 | 8.6 | 6.2 | 0.00 |
| 4 | 8.0 | 4.4 | 0.04 |

The data show that the fines are reduced to less than one-fourth of one percent of the fines in the feed. In addition, a carload of the oiled pellets unloaded from a hopper car at least three times as fast as a carload of the dry pellets and faster than any other carload of pellets ever received by a well-known tire and rubber company. The oiled pellets also loaded into the car faster than dry pellets of the type fed to the mill and did not require topping or poling.

Another advantage of the oiled pellets was observed in preparing cold rubber stocks reinforced with black-oil mixture. Such stocks processed higher modulus and better abrasion than comparable controls where both black and oils were separately added on the mill.

In instances where the carbon black pellets are to be incorporated in an aqueous dispersion of rubberlike material or an elastomer, it is advantageous to incorporate in the oil a small amount of a wetting or dispersing agent, such as one or more of those listed by Van Antwerpen in "Surface-Active Agents," published in Industrial and Engineering Chemistry, vol. 33, No. 1, pages 16-22, January 1941; and vol. 35, No. 1, pages 107-117 and 126-130, January 1943. Agents soluble in the oil being sprayed should be selected.

Numerous modifications of the invention can be made within the scope of the preceding disclosure. It should be realized that the illustrative details set forth herein are merely explanatory and should not be construed as unnecessarily limiting the invention.

We claim:
1. A process for impregnating dry pellets of carbon black with a controlled amount of oil which comprises continuously introducing dry unoiled pellets of carbon black into one end of a horizontally elongated, rotating, cylindrical drum so as to cause a bed of said pellets to continuously move through said drum to an outlet in the other end thereof; continuously weighing said pellets immediately before introducing them to said drum; continuously spraying oil onto said bed of pellets and regulating the rate of flow of said oil to said bed in accordance with the total weight of pellets being introduced thereto so as to maintain a constant ratio of weight-of-oil to weight-of-pellets.

2. The process of claim 1 in which the oil amounts to from 5 to 15 weight percent of the pellets.

3. Apparatus for effecting controlled impregnation of dry carbon black pellets with oil which comprises, in combination, a horizontally elongated, rotatable, cylindrical chamber having a pellet inlet in one end and a pellet outlet in the opposite end; spray means in said chamber for spraying oil onto pellets in the lower section thereof; an oil line connected to said spray means, having therein a pressure-actuated flow control valve and a rateof-flow measuring device which generates a force proportional to rate of flow in said line; a weighing conveyor in communication with the inlet to said chamber, including a weight indicating transmitter which generates a force proportional to the weight of material passing over said conveyor; a ratio controller in communication with said weight-indicating transmitter and with said rate-of-flow measuring device; and a ratio-receiver-flow-controller communicating with said ratio-controller and with said pressure-actuated valve which regulates said valve in response to variations in the force impulse produced by said ratio-controller.

4. Apparatus for effecting controlled impregnation of dry carbon black pellets with oil which comprises, in combination, a horizontally elongated, rotatable, cylindrical chamber having a pellet inlet in one end and a pellet outlet in the opposite end; spray means in said chamber for spraying oil onto pellets in the lower section thereof; an oil line connected to said spray, having therein a pressure-actuated valve for controlling the rate of flow of oil therethrough and means for measuring said rate and transmitting a force proportional to said rate; a weighing conveyor in communication with the inlet to said chamber having means connected therewith for translating weight values into a force of varying intensity proportional to said values; means for correlating the forces derived from said rate of flow and from said weight values to provide a ratio and translate same to a force proportional to said ratio; and means connected with said last-named means and with said pressure-actuated valve for actuating same so as to regulate oil flow in such manner as to maintain a constant ratio between said forces.

5. Apparatus for effecting controlled impregnation of dry carbon black pellets with oil which comprises, in combination, a horizontally elongated rotatable cylindrical chamber having a pellet inlet in one end and a pellet outlet in the opposite end; spray means in said chamber for spraying oil onto pellets in the lower section thereof; an oil line connected to said spray means having therein a pneumatic motor flow-control valve and a rotameter-flow-controller; a weighing conveyor in communication with the inlet to said chamber including a weight indicating pneumatic transmitter; a pneumatic ratio controller connected to said weight-indicating transmitter and to said rotameter-flow-controller; and a pneumatic flow-controller connected with said ratio-controller and with said motor valve.

6. Apparatus for effecting controlled impregnation of dry carbon black pellets with oil which comprises, in combination, a horizontally elongated rotatable cylindrical chamber having a pellet inlet in one end and a pellet outlet in the opposite end; spray means in said chamber for spraying oil onto pellets in the lower section thereof; an oil line connected to said spray means having therein a pneumatic motor flow-control valve and a rotameter-flow-controller; a weighing conveyor in communication with the inlet to said chamber including a pneumatic weight indicating transmitter; and a pneumatic ratio-flow-controller in actuatable communication with said weight-indicating transmitter and with said rotameter-flow-controller and in actuating communication with said motor valve, said controller being adapted to maintain a constant ratio between the pneumatic forces received from said transmitter and from said rotameter-flow-controller and thereby maintain a constant ratio between the weight of oil and the weight of pellets passing to said chamber.

7. Apparatus for effecting controlled impregnation of dry carbon black pellets with oil which comprises, in combination, a horizontally elongated, rotatable, cylindrical chamber having a pellet inlet in one end and a pellet outlet in the opposite end; spray means in said chamber for spraying oil onto pellets in the lower section thereof; an oil line connected to said spray means, having flow control means therein; a weighing conveyor in communication with the inlet to said chamber having weight indicating means; rate-of-flow-measuring means in said oil line; means for sensing the rate-of-flow indicated by said measuring means and the weight on said weight indicating means; and means for varying said flow control means in said oil line in response to the ratio of said rate-of-flow to said weight so as to maintain a desired ratio between the flow rate of oil and the weight of the pellets passing over said conveyor.

References Cited in the file of this patent

UNITED STATES PATENTS

| Re. 21,379 | Glazner | Mar. 5, 1940 |
| 2,050,193 | Park | Aug. 4, 1936 |
| 2,167,674 | Offutt | Aug. 1, 1939 |
| 2,528,199 | Watson | Oct. 31, 1950 |
| 2,581,205 | Reilly | Jan. 1, 1952 |
| 2,635,057 | Jordan | Apr. 14, 1953 |
| 2,699,381 | King | Jan. 11, 1955 |

FOREIGN PATENTS

| 620,133 | Great Britain | Mar. 21, 1949 |